United States Patent
Cass

(10) Patent No.: US 7,606,352 B2
(45) Date of Patent: Oct. 20, 2009

(54) METHOD AND SYSTEM OF PROCESSING MESSAGES

(75) Inventor: William Edward Wyndham Cass, Wellington (NZ)

(73) Assignee: Spinvox Limited, Marlow (GB)

( * ) Notice: Subject to any disclaimer, the term of this patent is extended or adjusted under 35 U.S.C. 154(b) by 500 days.

(21) Appl. No.: 10/498,928

(22) PCT Filed: Dec. 13, 2002

(86) PCT No.: PCT/NZ02/00275

§ 371 (c)(1),
(2), (4) Date: Nov. 2, 2004

(87) PCT Pub. No.: WO03/051026

PCT Pub. Date: Jun. 19, 2003

(65) Prior Publication Data

US 2005/0070255 A1      Mar. 31, 2005

(30) Foreign Application Priority Data

Dec. 13, 2001   (NZ) ..................................... 516124

(51) Int. Cl.
  *H04M 3/487* (2006.01)
(52) U.S. Cl. .................. 379/88.22; 379/75; 379/88.01; 379/88.11; 379/88.14; 455/72; 455/412.1; 709/223
(58) Field of Classification Search ............. 379/88.14, 379/88.22, 88.13, 211.02, 75, 88.01, 88.11; 375/240; 455/412.1, 422.1, 72; 709/206, 709/223
See application file for complete search history.

(56) References Cited

U.S. PATENT DOCUMENTS

| 5,003,574 | A | * | 3/1991 | Denq et al. .................... 379/75 |
| 5,105,197 | A |  | 4/1992 | Clagett ....................... 342/419 |
| 5,469,491 | A | * | 11/1995 | Morley et al. ............. 379/88.13 |
| 5,881,104 | A | * | 3/1999 | Akahane ..................... 375/240 |
| 6,151,491 | A | * | 11/2000 | Farris et al. ............... 455/412.2 |
| 6,230,197 | B1 | * | 5/2001 | Beck et al. ................... 709/223 |
| 6,295,552 | B1 | * | 9/2001 | Shibata ....................... 709/206 |
| 6,424,822 | B1 | * | 7/2002 | Mekuria et al. ............... 455/72 |
| 6,424,830 | B1 | * | 7/2002 | O'Hagan et al. ......... 455/422.1 |
| 6,449,342 | B1 | * | 9/2002 | Johanson .................. 379/88.11 |
| 6,865,258 | B1 | * | 3/2005 | Polcyn ..................... 379/88.01 |
| 7,197,128 | B1 | * | 3/2007 | Stumm et al. .......... 379/211.02 |
| 7,221,933 | B2 | * | 5/2007 | Sauer et al. .............. 455/412.1 |
| 2004/0057562 | A1 | * | 3/2004 | Myers et al. ............. 379/88.14 |

FOREIGN PATENT DOCUMENTS

| FR | 2 668 870 | 5/1992 |
| WO | WO 98/44709 | 10/1998 |
| WO | WO 01/10101 A1 | 2/2001 |
| WO | WO 01/74023 | 10/2001 |

* cited by examiner

*Primary Examiner*—Gerald Gauthier
(74) *Attorney, Agent, or Firm*—Mark D. Fox

(57) ABSTRACT

The invention provides a method of processing messages. The method includes the step of obtaining a subscriber message, from a subscriber communication device over a telecommunications network, the subscriber message representing a voice message from a subscriber. The subscriber message is stored in computer memory and then presented in an audio form to a human operator. A data file is composed which is derived from the subscriber message and the data file transmitted to a subscriber computing device and/or the subscriber communication device. The invention provides a related system for processing messages.

13 Claims, 6 Drawing Sheets

METHOD AND SYSTEM OF PROCESSING MESSAGES

FIELD OF INVENTION

The invention relates to method(s) and process(s) used for transmitting data between electronic messaging systems, independent of the voice message form that the data was originated, and more particularly to provide an efficient means of allowing users to update data stored on a personal computer using a communications device, such as a mobile device connected to cellular network or telephone connected to the public switched telephone network (PSTN).

BACKGROUND TO INVENTION

The use of personal computing devices by consumers is growing. The number of personal computing devices has grown substantially in both the type and number. To cope with increasingly busy modern lifestyles, individuals are increasingly using personal computing devices running sophisticated e-mail and personal information manager (PIM) computer programs, to assist them organise their lives. These computer programs run on personal computers in fixed locations and on mobile devices.

Mobile devices include cellular phones that now have enough memory and processing power to store contact information, text message, surf the Web, and picture/video messaging. Personal computers are no longer relegated to just desktop or notebook computers, increasingly they are being miniaturized to more closely resemble traditional mobile devices. For example, small hand-held devices such as personal digital assistants (PDA) have evolved into powerful devices, such as Palm Pilot and Pocket PC, and these are now being integrated with mobile phones to form hybrid mobile phone/pocket PC mobile devices.

Many users, in their enthusiasm to embrace new technology, find it difficult and time consuming to enter information on their different personal computing devices For example, many of today's cell phones have a diary feature which users may not use often due to the number of steps necessary to enter appointment information. To overcome this problem, some mobile devices have unique interfaces such as writing pads or miniature keyboards to facilitate recording information and updating calendars, phone lists and other features of mobile devices. Many users also use desk top or PC based organizer software such as Microsoft's personal computer-based "Outlook" and regularly use other software in their day to day activities but are unable to always have access to that desk top computer at all times.

In response to these problems, many users make use of synchronization computer programs or network-based services to periodically replicate data between disparate information stores. One example of this involves transferring data directly between Microsoft's personal computer-based "Outlook" and pocket PC-based "Pocket Outlook" e-mail applications via direct cable/wireless local area connection between the devices. Other systems maintain a single personal calendar data store and neglect the rest. For example, users may keep their e-mail program's personal calendar updated but not their mobile device's personal calendar program. For senior executives or business owners, often the later approach is used in conjunction with the services of a secretary or personal assistant, with the appropriate rights and permissions to access and make changes to the user's e-mail program's information and data.

One solution is described in WO 01/74023 to Sun Microsystems Inc. It describes a system in which a mobile device is registered with a server and the user of that mobile device transmits commands to the server in a particular data format for remotely managing and/or accessing information stored on a network device. Such a data format can often be difficult and time-consuming for a consumer to adopt.

SUMMARY OF INVENTION

In one form the invention comprises a method of processing messages comprising the steps of obtaining a subscriber message, from a subscriber communication device over a telecommunications network, the subscriber message representing a voice message from a subscriber; storing the subscriber message in computer memory; presenting the subscriber message in an audio form to a human operator; composing a data file derived from the subscriber message; and transmitting the data file to a subscriber computing device and/or the subscriber communication device.

In another form the invention comprises a system for processing messages comprising a mail system configured to obtain a subscriber message from a subscriber communication device over a telecommunications network, the subscriber device representing a voice message from a subscriber; a database maintained in computer memory configured to store the subscriber message; a retrieval component configured to retrieve a subscriber message from the database and to present the subscriber message in an audio form to a human operator; and a data entry component configured to obtain data from the human operator derived from the subscriber message.

BRIEF DESCRIPTION OF THE FIGURES

Preferred forms of the method and system of processing messages will now be described with reference to the accompanying figures in which.

DETAILED DESCRIPTION OF PREFERRED FORMS

Figure 1:
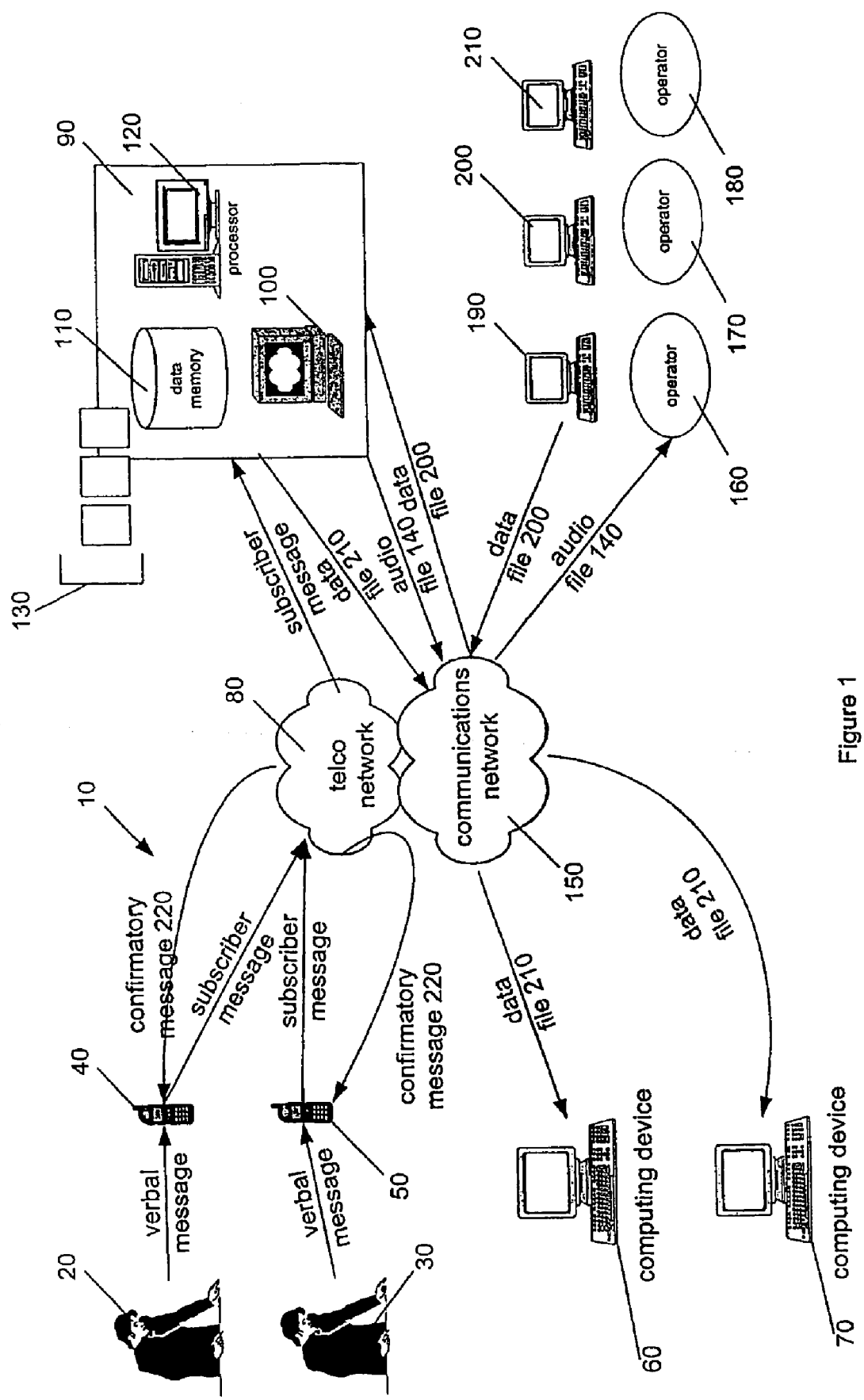
FIG. 1 shows a block diagram of a system in which forms of the invention may be implemented.

FIG. 1 illustrates a block diagram of the preferred system 10 in which forms of the present invention may be implemented. The invention provides a method and system for a subscriber to a service, for example subscriber 20 or subscriber 30, to transmit data in the form of either (1) a voice call from telephone 40 or mobile device 50 or (2) a mobile originated text message (MO e-mail) using mobile device 50 to a subscriber computing device, for example computing device 60 or computing device 70.

Mobile devices 40 and 50 could include for example a cellular phone, a two-way pager, or mobile computer. Computing devices 60 and 70 could include for example a personal PDA, a personal computer, or other computer system running the appropriate application software. Such a computer system could be operated by either subscriber 20 or 30 or a trusted third party, such as a hospitality service provider or travel agent. The computing devices 60 and 70 could also include purpose-built computing devices installed for example at a subscriber's premises.

To initiate an operator-assisted process, the subscriber 20 or 30 originates either (1) a voice call to a voice mail or Internet protocol (IP voicemail) gateway using a mobile device 40 or 50, or (2) a mobile originated text message using the mobile device. The inbound subscriber voice call to the service or mobile originated text message is then transmitted over a telecommunications, PSTN or mobile network. The identity of the subscriber initiating an operator-assisted process can be identified by either (1) the calling party number (A number) for voice calls and also the reply email address, in the case of mobile originated e-mail messages.

The voice call or mobile originated text message is passed through the telecommunication network 80 to a computer host or mail system 90. The system 90 includes call termination equipment which turns the call into an H.323 data stream and passes the data stream to a web server 100 which in one form could be configured as an H.323 gatekeeper server. The gatekeeper server passes the H.323 data stream to an H.323 voice recording server. It will be appreciated that the gatekeeper server and the voice recording server could be implemented on the same or different computer equipment.

The mail system 90 includes a database 110 maintained in computer memory and a processor 120. The database 110 could have stored in it known subscribers to the service. The database could be stored as a relational database with each record of the database representing a different subscriber and each record including or identified by the calling party number.

In the case of a voice call, the voice recording server extracts the calling party number from the voice call and checks database 110 to determine whether or not the voice call belongs to a subscriber of this service.

If the calling party number of the voice call matches a calling party number in the database 110, then the voice recording server assumes that the subscriber who has sent the voice call is a subscriber to the service. The server plays a message to the subscriber prompting the subscriber to leave a message.

On the other hand, if the calling party number does not match a calling party number stored in the database 110, the voice recording server assumes that the subscriber is not a subscriber to the service and returns a message to the subscriber at the calling party number saying that the subscriber is not registered for the service and to contact customer services.

The voice recording server translates the voice call from the subscriber to an audio file. The H.323 server creates a new record in the database 110 containing the audio file together with metadata, for example the date, time and the calling party number relevant to the audio file.

It is envisaged that the message could first be stored on mobile device 40 or 50 and transmitted over telecommunications network 80 at a later date. This buffering function would be useful, for example, where a particular mobile device is outside of a coverage area and unable to transmit a voice call or text message immediately.

Each inbound voice call or text message sent by a subscriber is received by a voice mail, or an IP voicemail server, or an e-mail system (collectively also known as a messaging system) located either on (1) the message-processing service bureau's premises or on the telecommunications network 80. All inbound messages are stored in either: (1) a computer-based message store (MS) 110 for retrieval by a single operator (also known as an agent) or (2) a network-based post office (PO) or message store server (MSS) 110 for distribution and delivery to the e-mail client of two or more operators (agents). Examples of the stored subscriber messages are indicated at 130.

It is envisaged that the subscriber messages be stored in computer memory in an appropriate form. For example, (1) where the subscriber voice calls are terminated by an enterprise-based voice mail gateway that supports Microsoft's telephony application programming interface (TAPI), then voice messages would be converted and stored as e-mail messages (ASCII and binary); (2) where subscriber voice calls are terminated by a network-based IP voicemail server then voice messages would undergo Internet protocol conversions, to support TCP/IP transport and multipurpose Internet mail extension (MIME) e-mail format, before being delivered by a simple message transfer protocol (SMTP) to the message-processing service bureau's e-mail system; and (3) where subscriber MO e-mail is delivered by a network-based message transfer agent (MTA) using SMTP, then the message would be stored as an ASCII text message.

The above message collection and storage processes, depending on the desired scalability of the service, would all allow voice call originated messages to eventually be collected, stored, and distributed to other parts of the system as email messages, including ASCII text and binary support, for example with .wav (audio) file attachments.

In one preferred form of the invention, each message stored in computer memory is allocated a message identifier (message ID) and a subscriber identifier (user ID) where the subscriber is identified from the mobile device's A number from which the message originated. The time and date that the message was transmitted from the mobile device or the time and date the message was received at the mail system could form part of the message store server (MSS) database in the messaging system computer memory. In this way, the messages 130 could be stored in an ordered sequence, for example a first in first out (FIFO) queue. It is envisaged that other ordered sequences could be implemented, for example last in first out (LIFO) or alternatively individual subscribers could be ordered in the sequence ahead of other subscribers.

Each subscriber message is fetched from database 110 by processor 120 and transmitted as an audio file 140 over communications network 150 or otherwise to an operator, for example operator 160, operator 170, or operator 180 in a voice message form, i.e. an e-mail with .wav audio attachment, as an output from an e-mail program running on multimedia computer equipped with a sound card and audio headset or speakers. Where more than one subscriber message is stored in database 110, it is envisaged that queued subscriber messages be distributed from the computer memory to an operator who is available for processing messages (ie logged in) and who is not currently processing a message. Where the subscriber messages form an ordered sequence, it is envisaged that successive subscriber messages be retrieved from the computer memory 100 in accordance with the location in the message queue.

It is envisaged that each operator be associated with or at least have access to respective workstations 190, 200 or 210. The workstations preferably include a computer memory, a processor, a display device and an audio device.

The audio file 140 is passed to the workstation of the next available operator. Software installed on the workstation, which is described below, causes the audio file to be played through the audio device to the operator. The operator listens to the message and actions the message based on the content of the message. Using software installed on the workstation, the operator processes the message. On completion, a data file 200 is transmitted from the operator workstation over the communications network 150 back to the mail system 90.

The mail system 90 then sends data file 210 through communications network 150 to computing device 60 or 70 in a format pre-selected by the subscriber 20 or 30. It is also envisaged that the mail system 90 transmits a confirmatory message 220 over the telecommunication network or mobile network 80 to subscriber device 40 or 50.

It is envisaged that subscribers 20 and 30 pre-register with the system. The registration process would specify the communication networks and the computing devices available to the system over which to transmit operator messages.

The operator could, for example, receive a request from a subscriber to enter a contact into Microsoft Outlook. The operator receives the verbal instruction in the form of a voice message from the subscriber and enters the requested data into an operator workstation. The data would then be transmitted over a communications network in the form of a local area network or LAN, Internet or other suitable network in the form of a self-extracting file or equivalent to a computing device in the form of a subscribing workstation on which Microsoft Outlook is installed and operating. It is also envisaged that the subscriber be registered to send other data items, for example calendar entries, alarms notes or tasks to subscriber device 40 or 50.

It is also envisaged that a subscriber may pre-register to enable an operator to initiate, process or transmit requests to a third party person(s) or a third party computing device in the form of a restaurant booking system or a travel agent booking system or to a user accounting system It is also envisaged that a subscriber may pre-register to enable an operator to transmit requests to a mobile phone in the form of a self extracting mobile telephony instructions for adding names and contacts, setting alarms and utilising other functions of the mobile phone.

As described above, the system could transmit a confirmatory message 220 over telecommunications network 80 back to the originating mobile device, as is shown with mobile device 50. Such a confirmatory message in the form of a text message could be transmitted following successful transmission of the operator message to the subscriber computing device over the communications network.

In a further preferred form of the invention the mail system 90 could include, or at least be interfaced to, a device for preserving the anonymity of a subscriber. Such a device could, for example, alter the pitch or tone of a subscriber message when presented to an operator or could slow down or speed up such a message to ensure that the operator is not able to identify the subscriber.

In a further preferred form of the invention the subscriber 20 or 30 may choose to have a key word or code word which will form part of the subscriber message enabling the system to verify the identification of subscriber 20 or 30 and thereby making available secure services such as making purchases from a retailer on behalf of the subscriber.

It is also envisaged that a subscriber may pre-register to enable an operator to transmit command strings to a computing device in the form of standard interface protocols such as RS232 in the case of generic devices or proprietary communications commands for example to a home automation system and/or "smart appliances" owned by a subscriber. Such a device could for example enable an operator to transmit requests to a computing device controlling a cable or digital broadcast system to schedule or receive transmissions. In this case computing device(s) 60 or 70 could include a home automation control system and/or smart appliances.

Figure 2:
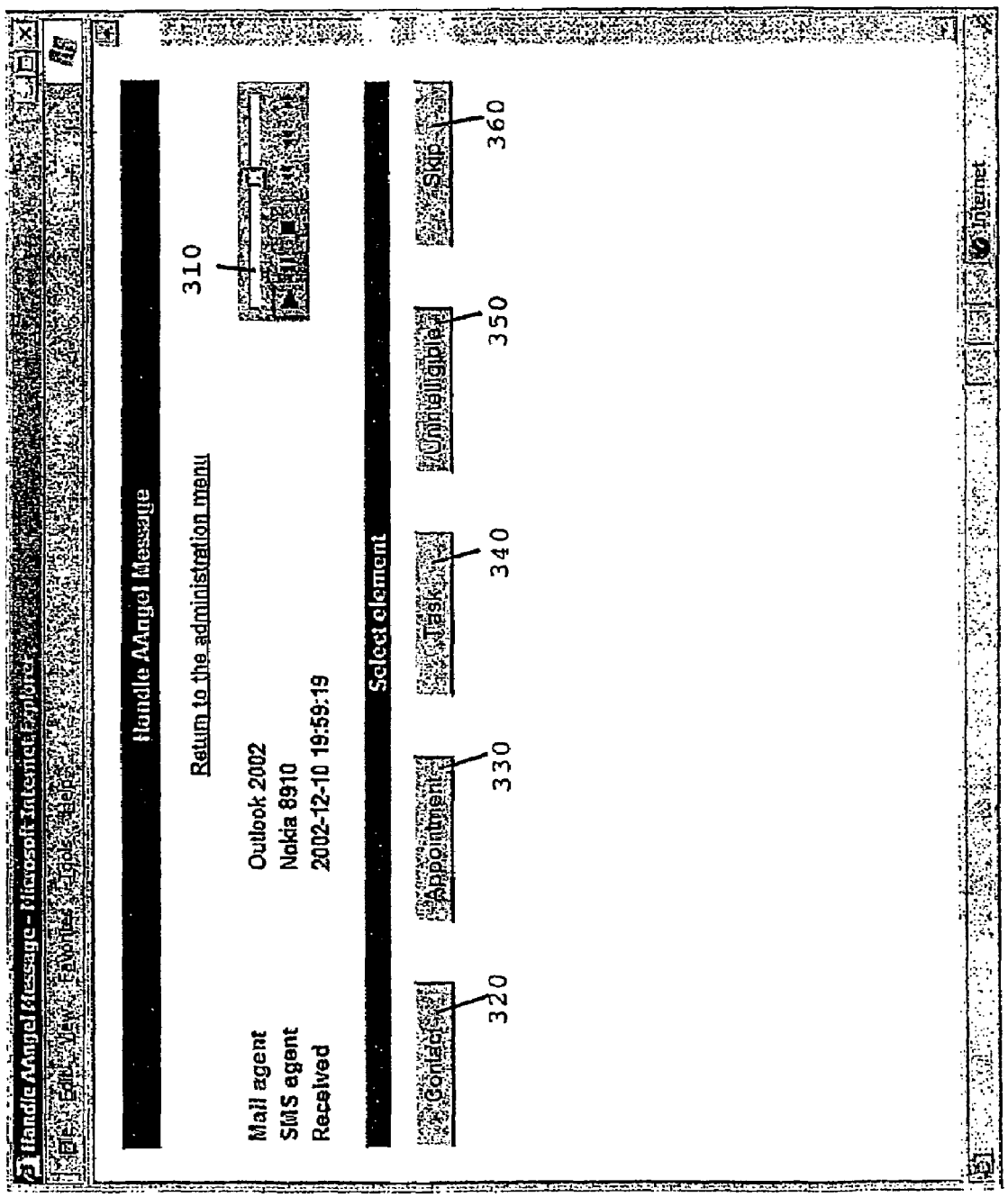
FIG. 2 illustrates a preferred form initial screen presented to an operator.

The software installed on operator workstations is now described in more detail. The operator preferably uses a web browser to enter data into forms on the server from which data files are transmitted to system 90. FIG. 2 illustrates an initial screen or form which could be presented to an operator indicating that a new message is in the queue. The audio file representing the message is played to the operator using the audio device on the operator workstation. The message continually plays until the operator has finished processing the message. A control bar 310 could be provided which enables an operator to stop or pause a particular message, or to skip to the previous message, the next message or the first or last message in a queue. It is envisaged that the skip function could be used if the message should be passed to a supervisor or is perhaps noise requiring no action.

Generally each subscriber message will represent a contact, an appointment or a task or a subscriber specific task such as a booking request or home automation command request. The operator decides whether a message fits best within a contact, appointment or task and selects the appropriate element by clicking on contact button 320, appointment button 330 or task button 340 respectively which are further described below. If the message is unintelligible, the operator selects the unintelligible button 350 or can elect to skip the message by selecting skip button 360.

Figure 3:
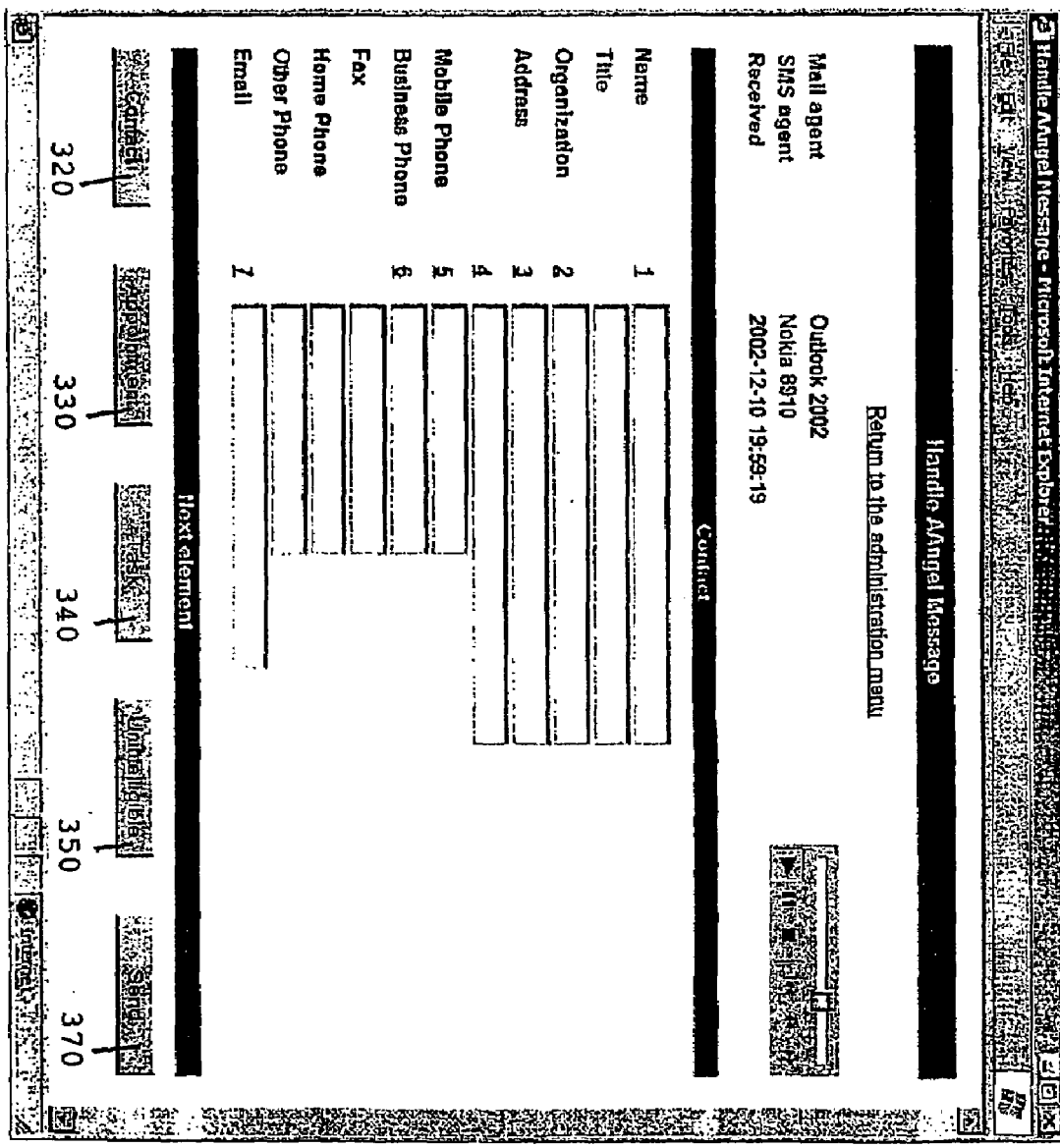
FIG. 3 shows a preferred form contact entry form.

FIG. 3 illustrates a contact entry form. The operator is able to enter data such as name, title, organization, address, mobile phone, business phone, fax, home phone, other phone and/or email. A "contact" message represents a new contact the subscriber wishes to be sent to the computing device 60 or 70.

Preferably the web form provides hot keys for the operator taking the data entry cursor directly to a relevant field. For example, Alt-1 would move the data entry cursor to the name field and Alt-5 would take the data entry cursor to the mobile phone number.

It is possible that the same message may contain more than one element. For example, the message may contain one or more different contacts, appointments or tasks. If the message contains a further element, the operator can enter a new contact, appointment or task by selecting contact, appointment or task buttons 320, 330 and 340. If the next element is unintelligible, the operator selects the unintelligible button 350. Otherwise, the user clicks the send button 370 to compile the data into a data file and transmit the data file to the mail system 90.

Figure 4:
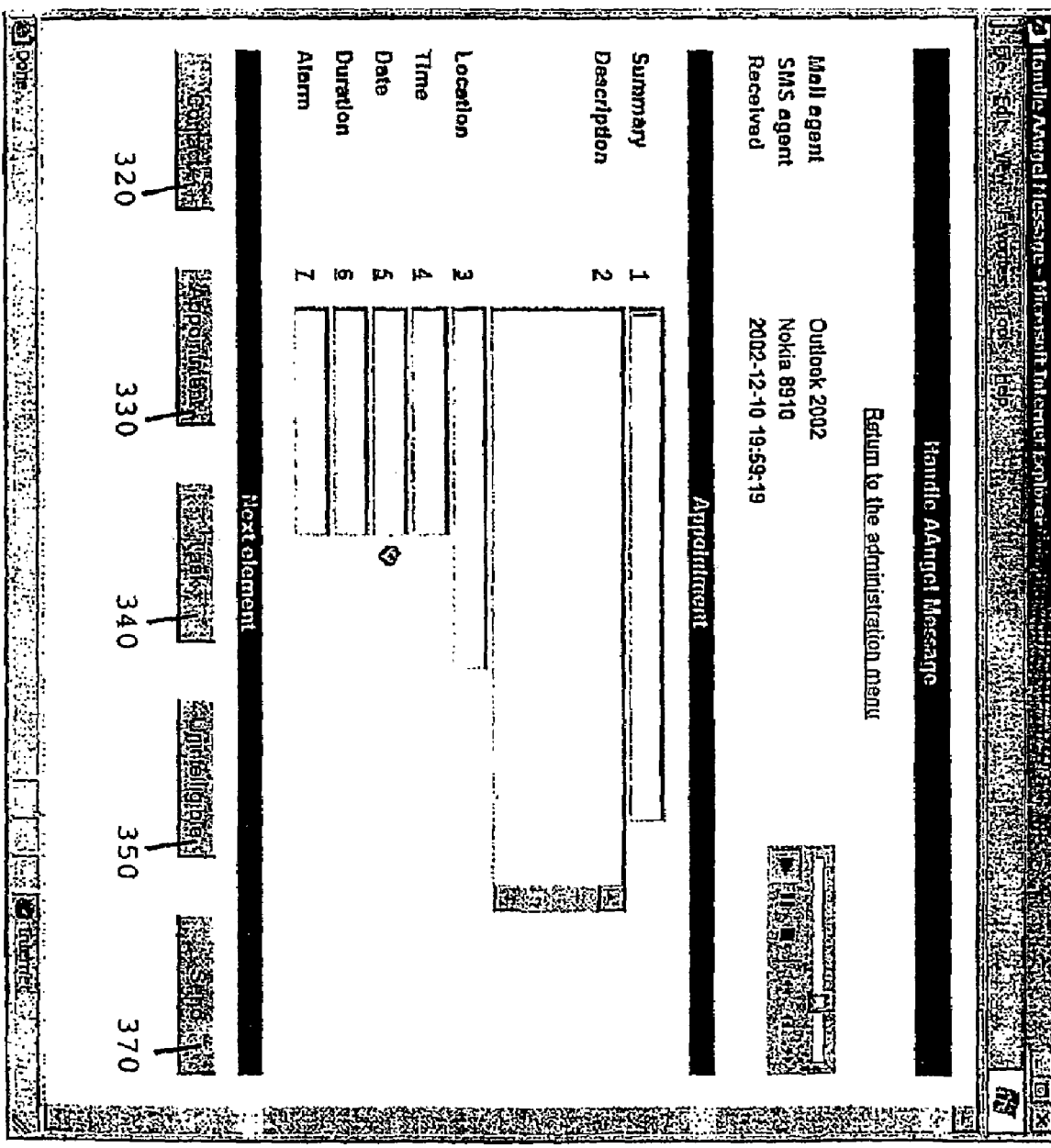
FIG. 4 shows a preferred form appointment entry form.

If the audio file contains a new appointment and the operator has recognized this part of the audio file as representing an appointment, the user selects the appointment user entry form and an example form is shown in FIG. 4. The user could enter, for example summary, description, location, time, date, duration and alarm, depending on the requirements of the user. Once again, hot keys could be provided for the operator to skip between different fields. On completion of the data entry fields, the operator selects the send button 370 to transmit the data, or brings up further contact, appointment or task user entry forms.

Figure 5:
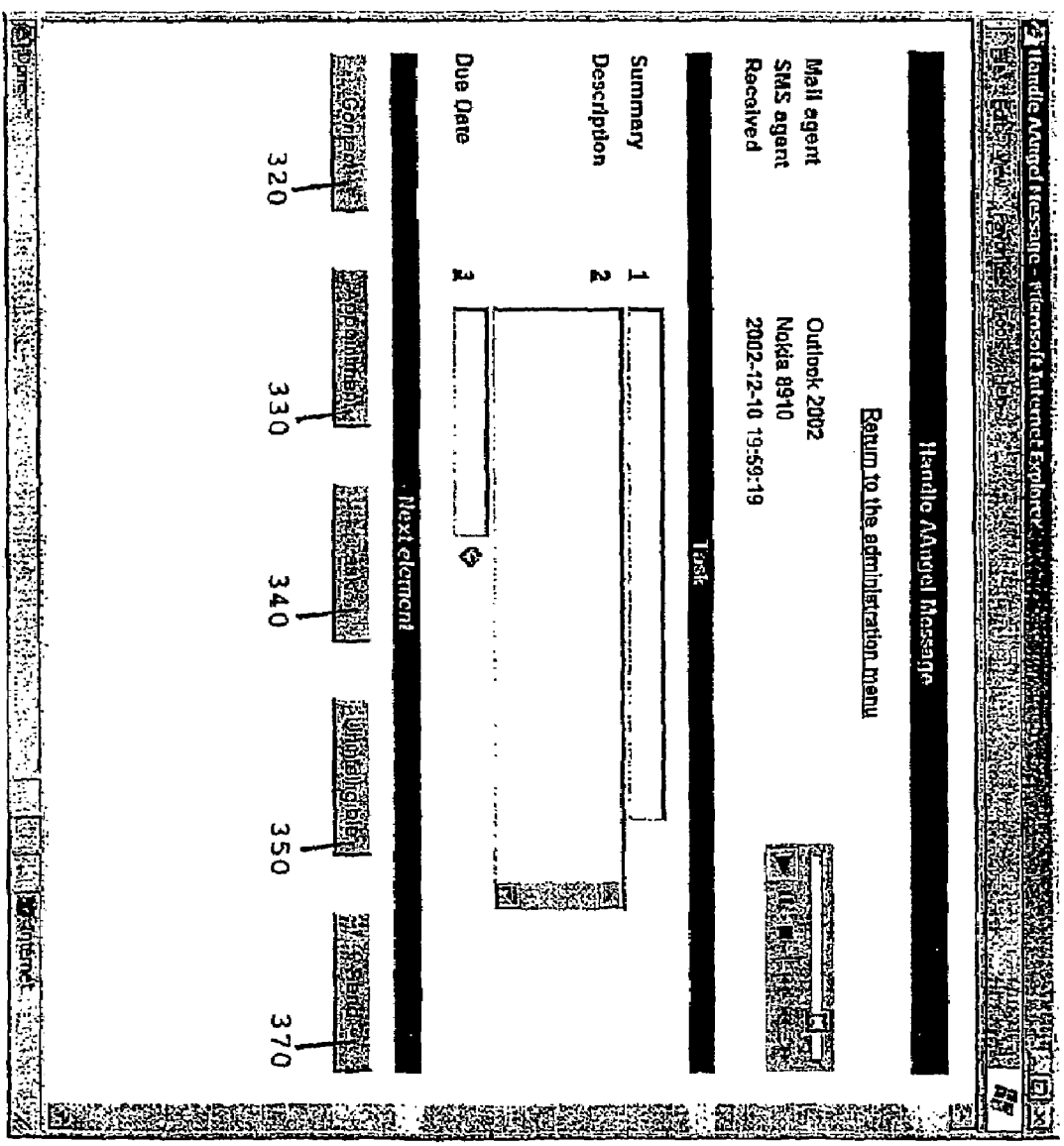
FIG. 5 shows a preferred form task entry form.

FIG. 5 illustrates a preferred data entry form for entering a task in which the operator is provided with a summary data entry field, a description field and a due date.

Hot keys could be provided to the operator to switch quickly between different fields. On completion, the user selects the send button 370 or one of the other buttons depending on the content of the message.

Figure 6:
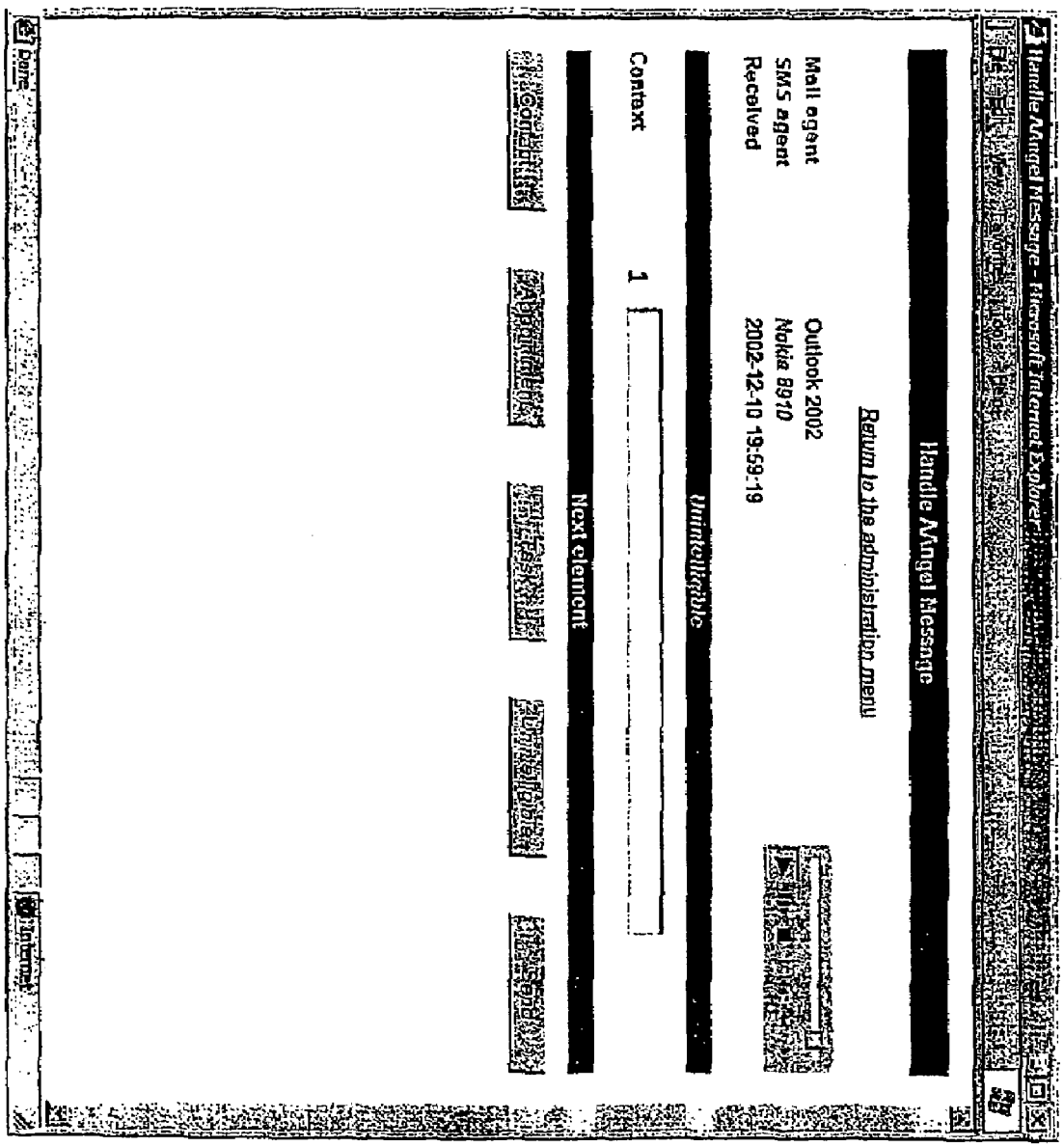
FIG. 6 shows a preferred form data entry form for unintelligible messages.

In some circumstances, the subscriber message may be partly or wholly unintelligible. For example, the message could clearly relate to a contact but the phone number for this contact is not clear. Alternatively, the message could include or represent an appointment but the time is not audible. In these circumstances, the operator selects the unintelligible button bringing up the unintelligible data entry form shown in FIG. 6. There is preferably only one field, a context field which allows the operator to enter data in the form of a text explanation stating in what context the message was not intelligible and a text message and email could be sent to the subscriber 20 or 30 indicating that the subscriber will need to retransmit or create a new subscriber message.

In one form, the invention provides a method to enable a subscriber to add contacts, appointments and tasks to computer organizer software and/or a cellphone.

To add a contact for example, a subscriber dials the appropriate messaging number and waits for a prompt. After the prompt, the subscriber states "new contact" or similar, provides name, company, phone, email and/or physical address details and hangs up. A minute or so later an email arrives on the subscriber's computer with the new contact in it. The subscriber opens the email, making any necessary additions or changes, and saves the file in the subscriber's list of contacts. A confirmatory message can also be sent to the subscriber's cellphone indicating a new contact and prompting the subscriber to view and/or save the contact in the address book of the cellphone.

To add a new appointment, a subscriber dials the same messaging number and waits for the prompt. After the prompt, the subscriber states "new appointment" and provides details. A minute or so later, an email arrives on the subscriber's computer with the new appointment in it. The subscriber is able to open the email, making any necessary additions or changes, and saves the new appointment in the subscriber's diary. A confirmatory message can also be sent to the user's cellphone showing a new calendar note received and prompting the user to view and/or save the new appointment in the calendar of the phone. The default is to insert an alarm in the calendar entry so that the subscriber is reminded about the appointment by the phone making an alarm sound or a pop-up dialogue box on the subscriber's computer.

To add a task for example, the subscriber dials the same messaging number and waits for the prompt. After the prompt, the subscriber states "new task" and provides details. A minute or so later an email arrives on the subscriber's computer with the new task in it. The subscriber opens tie task and adds the new task to the subscriber's task list. Where the user's cellphone supports tasks, a confirmatory message could be sent to the user's cellphone which beeps for attention and shows the new task received, prompting the user to view and/or save the task in the task list on the phone.

The subscriber can place further instructions in each message. For example, the subscriber could send the message "new contact, Reading Cinemas, Courtney Place, Wellington—look up the phone number please" and the subscriber receives the contact with the phone number inserted in the contact as an alternative to calling directory assistance.

The subscriber may further place specific "preset" instructions in each message. For example, the subscriber could send the message "wake up for tomorrow 6 am TV" and the subscriber's home automation system receives the appropriate command string to initiate a preset wake up mode and alarm time on that system for the given day or time. This could in this example open the blinds in the subscribers bedroom, turn on a preset lighting "scene" or start some favorite music or TV programme in a particular zone of the system at the given time.

The foregoing describes the invention including preferred forms thereof. Alterations and modifications as will be obvious to those skilled in the art are intended to be incorporated within the scope hereof, as defined by the accompanying claims.

The invention claimed is:

1. A method for organizing personal information for a subscriber comprising the steps of: obtaining a subscriber message over a telecommunications network, the subscriber message representing a voice message; translating the subscriber message to an audio file; storing the audio file in computer memory; presenting the audio file to a human operator; displaying to the human operator information identifying a plurality of data entry forms and means to select one of the data entry forms, a data entry form comprising at least one data entry field; displaying to the operator one of the data entry forms selected by the operator; populating at least one data field associated with the selected data entry form with text derived from the content of the audio file; composing a data file derived from the selected data entry form; and transmitting the data file to a subscriber computing device programmed with a personal information management (PIM) program for the subscriber to access the data file.

2. A method as in claim 1 further comprising the steps of storing two or more audio files from successive subscriber messages in computer memory; and retrieving successive audio files from computer memory to present to the human operator.

3. A method as in claim 1 further comprising the step of linking the subscriber message with a unique identifier code and storing the audio file with the unique identifier code.

4. A method as in claim 1 further comprising the step of transmitting the subscriber message in addition to the data file to the subscriber computing device.

5. A method as in claim 1 further comprising the steps of queuing and retrieving audio files from successive subscriber messages from computer memory in an ordered sequence.

6. A method as in claim 1 further comprising the step of distributing and presenting the audio file to one of a plurality of human operators.

7. A method as in claim 1 further comprising the step of transmitting the data file to the subscriber communication device that transmitted the subscriber message over the telecommunications network.

8. A method as in claim 1 further comprising the step of transmitting the data file to the subscriber computing device that transmitted the subscriber message over the telecommunications network over a communications network distinct from the telecommunications network.

9. A method as in claim 1 wherein the subscriber message comprises a voice message.

10. A method as in claim 1 wherein the subscriber message further comprises a text message.

11. A method as in claim 1 further comprising the step of composing the data file in accordance with a format prespecified by the subscriber.

12. A method as in claim 1 further comprising the step of transmitting a text message to the subscriber communication device that transmitted the subscriber message over the telecommunications network.

13. A system for processing messages comprising: a mail system configured to obtain a subscriber message from a subscriber communication device over a telecommunications network, the subscriber message representing a voice message; a device for translating the subscriber message to an audio file; a database maintained in computer memory configured to store the audio file; a retrieval component configured to retrieve a audio file from the database and to present the audio file to a human operator; a plurality of data entry forms maintained in computer memory, the data entry forms associated with at least one data field; an operator selection component configured to display to the operator information identifying a plurality of data entry forms and means to select one of the data entry forms; and a data entry component configured to display to the operator one of the data entry forms selected by the operator and to enable population of at least one data field associated with the selected data entry form with text derived from the content of the audio file.

* * * * *